United States Patent [19]
Litvin et al.

[11] Patent Number: 5,454,661
[45] Date of Patent: Oct. 3, 1995

[54] TUBING CONNECTOR

[76] Inventors: Charles Litvin, 1065 Stable La., West Chester, Pa. 19382; Kurt F. Hafeken, 67 Mercer Dr., Newark, Del. 19713

[21] Appl. No.: 145,103

[22] Filed: Nov. 3, 1993

[51] Int. Cl.⁶ .............................. F16B 2/20; F16B 7/00; F04D 29/64
[52] U.S. Cl. ................................ 403/298; 403/292
[58] Field of Search .................... 403/298, 295, 403/292, 217, 169

[56] References Cited

U.S. PATENT DOCUMENTS

| | | | |
|---|---|---|---|
| 3,759,623 | 9/1973 | Hesse | 403/298 |
| 3,873,220 | 3/1975 | Kashiwabara | 403/292 X |
| 4,111,577 | 9/1978 | Kiyosawa | 403/298 X |
| 4,662,775 | 5/1987 | Faul | 403/298 X |
| 4,852,501 | 8/1989 | Olson et al. | 403/298 X |
| 5,368,445 | 11/1994 | Litvin et al. | 403/298 X |

*Primary Examiner*—Anthony Knight
*Attorney, Agent, or Firm*—Zachary T. Wobensmith, III

[57] ABSTRACT

A tubing connector to join together two pieces of hollow tubing, which connector includes a disk like separator ring with a first rib extending from each side, which rib each has flat sides with a second rib perpendicular thereto, with additional ribs with tapered sides on each side of the second rib, which ribs fit into the tubing pieces in compressed relation, for securely retaining the tubing pieces together, but which can be readily removed if required. The connector is made of molded plastic.

5 Claims, 3 Drawing Sheets

5,454,661

TUBING CONNECTOR

BACKGROUND OF THE INVENTION

1. Field of the Invention

This invention relates to a one piece plug type hollow tubing connector.

2. Description of the Prior Art

There are many ways of assembling two pieces of hollow metal or plastic tubing. One way is to reduce the outside diameter of one end of one of the pieces of tubing so that it slip fits into an adjoining piece of tubing. This approach is used with diameters that are close in size, and requires a plurality of lengths of tubing upon which an extra manufacturing step is performed and requires close manufacturing tolerances. This approach causes an increase in cost and a result that is often less than satisfactory due to difficulties encountered during use and attempted disassembly of the tubing.

Another way of assembling two pieces of tubing involves the use of a short length of tubing with reduced diameter portions at each end, which is inserted into the pieces of tubing and which suffers from similar problems.

Various plug type connectors have been proposed, but none of them have proven satisfactory in that they suffer from either being difficult to assemble or disassemble, or they do not maintain good structural integrity between the tubing pieces which can result in the structure coming apart and damage to the fan or other item mounted to the tubing, and damage to the surrounding area.

The connector of the invention does not suffer from the shortcomings of the prior art, is easy to insert, securely grips the interior walls of the tubing and can be readily removed as desired.

SUMMARY OF THE INVENTION

This invention relates to a tubing connector which joins together two pieces of hollow tubing which connector is of cylindrical configuration and includes a separator ring from which a plurality of longitudinal ribs extend perpendicularly, with some flat and some shaped exterior surfaces on the ribs that are configured to conform to the interior surface of the tubing and which fit closely into the tubing under compression, so that the connector can be readily inserted and removed.

The principal object of the invention is to provide a tubing connector which securely joins together two pieces of hollow tubing but can be removed as required.

A further object of the invention is to provide a tubing connector that can join pieces of tubing of different diameters.

A further object of the invention is to provide a tubing connector that can be used with metal or plastic tubing.

A further object of the invention is to provide a tubing connector that is formed of molded plastic.

A further object of the invention is to provide a tubing connector that is economical to manufacture but sturdy and reliable in operation.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should of course be understood that the description and drawings herein are merely illustrative, and that various modifications and changes can be made in the structure disclosed without departing from the spirit of the invention. Like numerals refer to like parts throughout the several views.

DESCRIPTION OF THE PREFERRED EMBODIMENT

Figure 1:
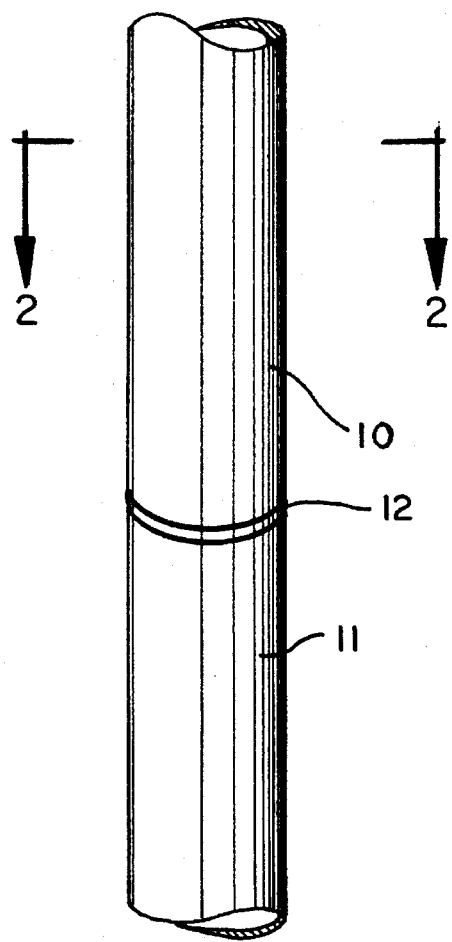
FIG. 1 is a front view of the tubing connector of the invention in use holding together two pieces of hollow tubing.

Referring now more particularly to the drawings and FIGS. 1 through 4 thereof, two pieces of round hollow tubing 10 and 11 are shown, which in the example illustrated are hollow metal tubing of the same size diameters, but could be formed of plastic and/or of different diameters.

A tubing connector 12 is illustrated which is of generally elongated cylindrical configuration with a centrally located disk-like separator ring 14, which in a preferred embodiment is shown as having an outside diameter of 0.8125 inches for tubing pieces 10 and 11, which have an outside diameter of 0.875 inches. The ring 14 has first ribs 15 extending perpendicularly therefrom from each side and in a preferred embodiment the ribs have a length of 1.5625 inches and a thickness of 0.75 inches. The ribs have flat outside surfaces 16 with end portions 18 at an inwardly inclined angle of 10° thereto to facilitate entry into a tubing piece 10 or 11.

The first ribs 15 each has a second rib 19 in perpendicular relation thereto, one each extending from each side of ring 14, with a thickness of 0.75 inches, of the same length as ribs 15, and with flat outside surfaces 20 which have end portions 21 thereon at an inwardly inclined angle of 10° thereto.

Figure 2:
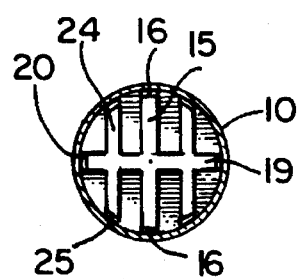
FIG. 2 is a horizontal sectional view taken approximately on the line 2—2 of FIG. 1.
Figure 3:
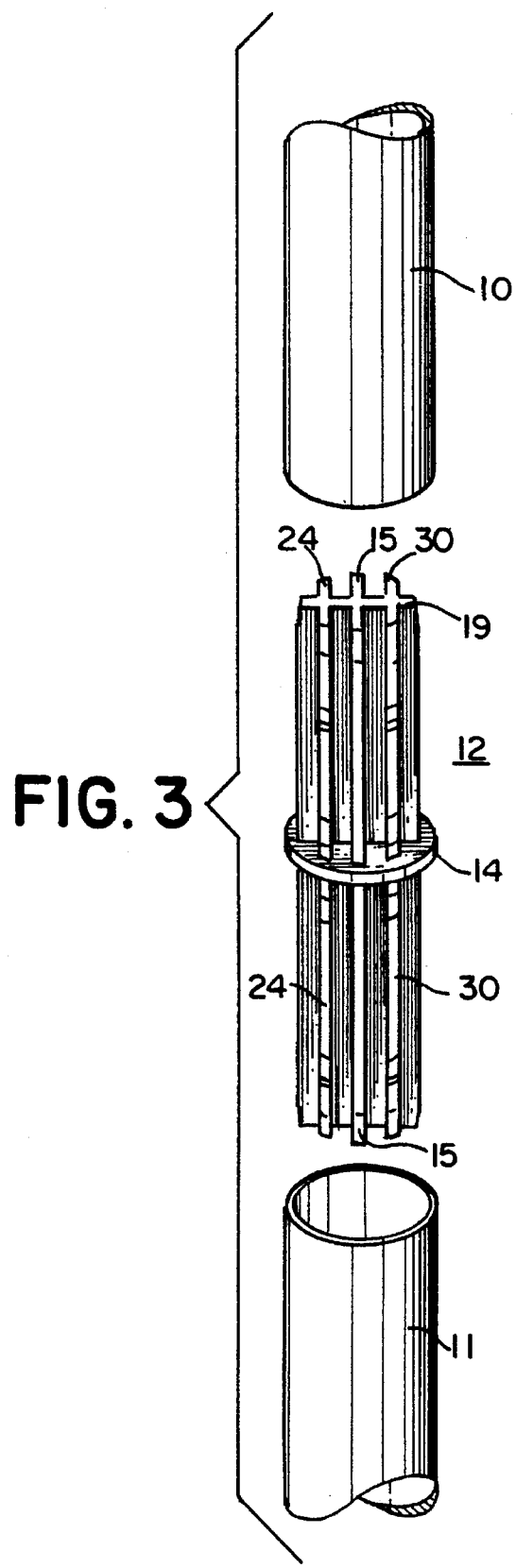
FIG. 3 is an exploded view of the structure shown in FIG. 1.
Figure 4:
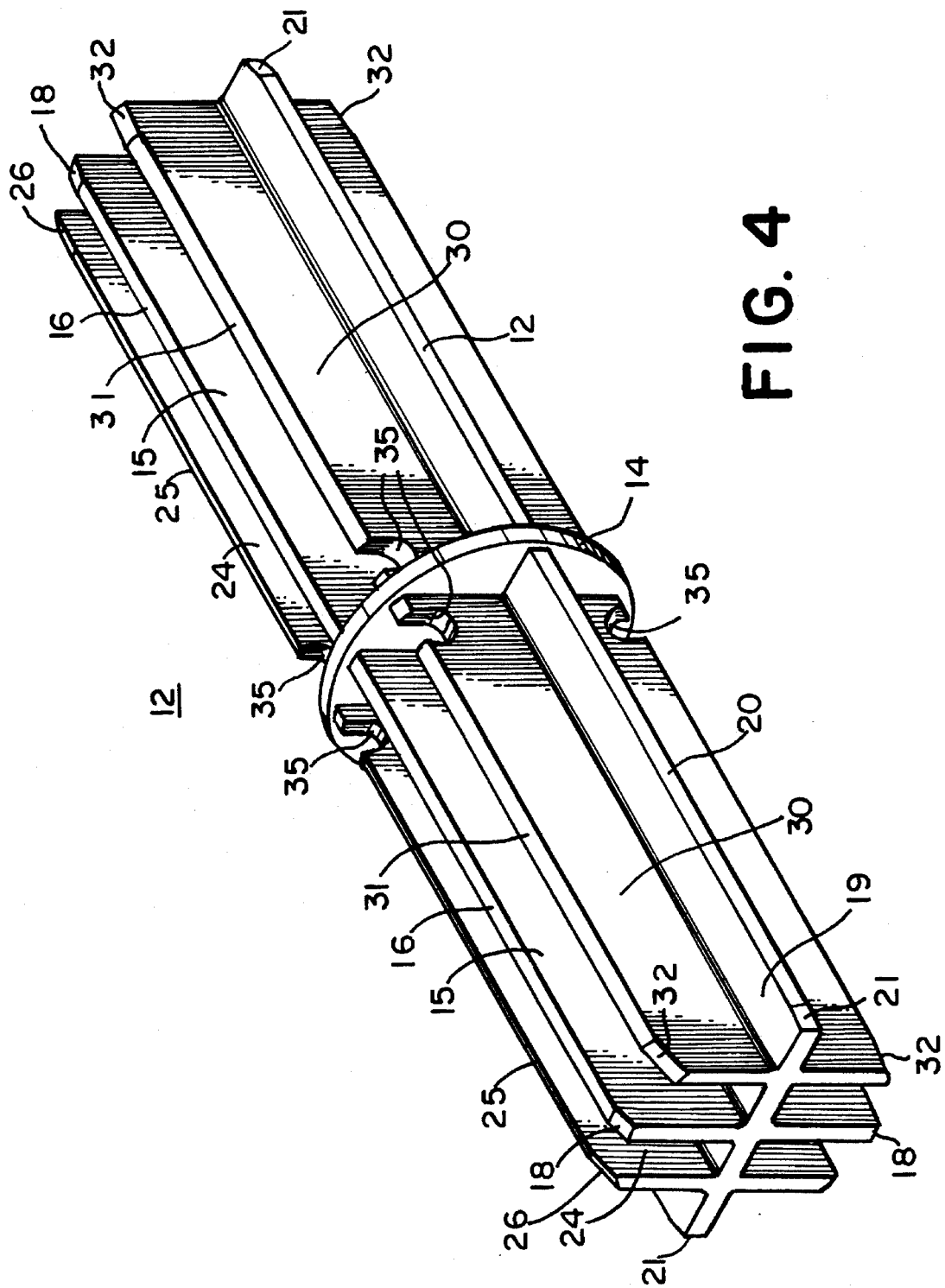
FIG. 4 is an enlarged, perspective view of the tubing connector of the invention.

As shown in FIGS. 2 and 4 third ribs 24 are provided, one of which extends from each side of ring 14, of the same length and in a parallel plane to the plane containing ribs 15 to the left thereof and perpendicular to ribs 19. The third ribs 24 have outside inclined surfaces 25 which follow the contour of ring 14 and the interior surfaces of tubing pieces 10 or 11. The ribs 24 each have end portions 26 which extend outwardly at an inclined angle of 10° thereto.

Fourth ribs 30 are provided perpendicular to ribs 19, in a plane parallel to the plane containing ribs 15, of the same length and spaced to the right thereof as shown in FIGS. 2 and 4, with inclined outer surfaces 31 which follow the contour of ring 14 and the interior surfaces of tubing piece 10 or 11. The ribs 30 each have end portions 32 which are inwardly inclined at an angle of 10° thereto.

The center line outside diameter from one surface 25 of rib 24 to the opposite surface 31 of rib 30 in the preferred embodiment is 0.75 inches.

The ribs 15, 19, 24 and 30 each have at least one relief cutout 35 spaced from the ring 14, and with a preferred radius of 0.063 inches.

Figure 5:
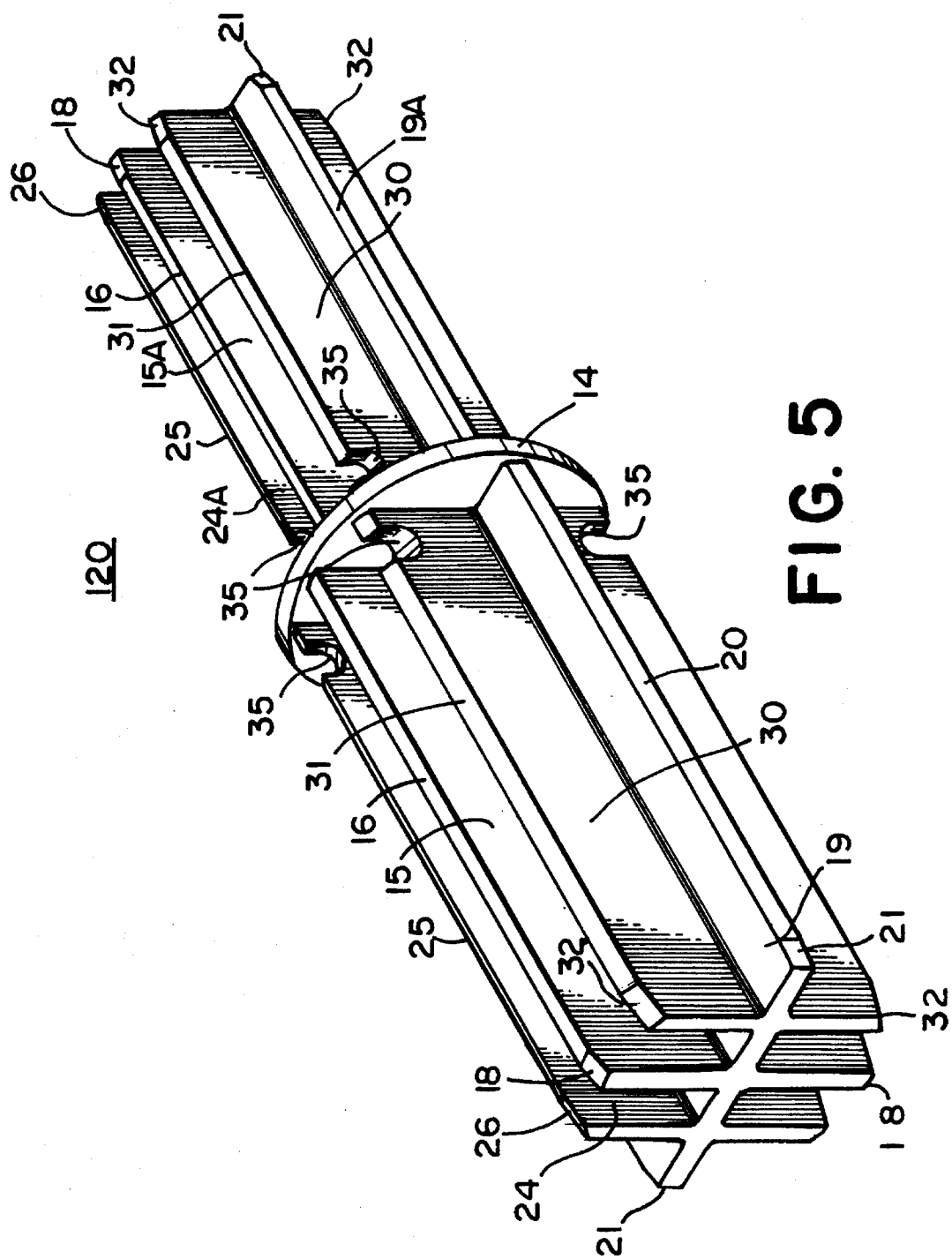
FIG. 5 is similar to FIG. 4, but illustrates a tubing connector for securing different diameter tubing pieces.

Referring now more particularly to FIG. 5 a tubing connector 120 is therein illustrated which is similar to connector 12, with ribs 15, 19 and 24 on one side of a separator ring 14, the same as FIG. 4. Ribs 15A, 19A, and 24A are provided on the other side of ring 14 similar in configuration to ribs 15, 19 and 24 but are of reduced thickness to permit the joining of tubing of different diameters. The ribs 15A, 19A and 24A respectively have flat outer surfaces 16A, 20A, and inclined outside surfaces 25A and end portions 18A, 21A and 26A, as described for FIGS. 1–4.

When assembly of two pieces of tubing 10 and 11 is desired the ribs 15, 16, 19, 24 and 30 of connector 12 are inserted into the pieces of tubing 10 and 11. The contoured outside surfaces 25 and 31 contact the inner surfaces (not shown) of tubing pieces 10 and 11, are slightly compressed and accordingly grip the surfaces. When disassembly is required, one tubing piece is rotated relative to the other and the tubing pulled off the connector 12.

It is thus apparent that a tubing connector has been provided with which the objects of the invention are attained.

We claim:

1. A tubing connector for interiorly detachably securing together two pieces of hollow round tubing which comprises:

an elongated cylindrical member having a flat disk-like centrally located separator ring, a plurality of elongated rib means extending perpendicularly from each side of said ring, said rib means including a first rib having flat outer surfaces, a second rib perpendicular to said first rib with flat outer surfaces, a third rib in a plane parallel to the plane of said first rib to one side thereof and of smaller thickness, said third rib having inclined outside surfaces, a fourth rib on the opposite side of said first rib and in a plane parallel thereto and of the same thickness as said third rib, said fourth rib having inclined outside surfaces, whereby said rib means inclined outside surfaces engage and are compressed by the inside surface of said hollow tubing.

2. A connector as defined in claim 1 which is formed of molded plastic.

3. A connector as defined in claim 1 in which said rib means outside surfaces have inwardly inclined end surfaces.

4. A connector as defined in claim 1 in which said rib means have relief cutouts therein.

5. A connector as defined in claim 1 in which said rib means on said one side of said ring is of different diameter than said other side rib means.

* * * * *